United States Patent [19]
Chambers et al.

[11] Patent Number: 5,987,584
[45] Date of Patent: Nov. 16, 1999

[54] WAVETABLE ADDRESS CACHE TO REDUCE ACCESSES OVER A PCI BUS

[75] Inventors: Peter Chambers; Scott Edward Harrow, both of Scottsdale, Ariz.

[73] Assignee: VLSI Technology, Inc., San Jose, Calif.

[21] Appl. No.: 08/717,529

[22] Filed: Sep. 17, 1996

[51] Int. Cl.⁶ .............................. G06F 12/00; G06F 12/02; G06F 12/10
[52] U.S. Cl. ..................... 711/220; 711/154; 711/200; 711/206; 711/207; 711/221; 710/126
[58] Field of Search .................................... 711/203, 208, 711/206, 207, 3, 137, 154, 200, 220, 221; 710/126, 130

[56] References Cited

U.S. PATENT DOCUMENTS

| | | | |
|---|---|---|---|
| 4,972,338 | 11/1990 | Crawford et al. | 711/206 |
| 5,295,253 | 3/1994 | Ducousso et al. | 711/207 |
| 5,321,836 | 6/1994 | Crawford et al. | 711/206 |

OTHER PUBLICATIONS

PCI Special Interest Group, "PCI Local Bus Specification Revision 2.1", p. ii, Jun. 1, 1995.

*Primary Examiner*—Tuan V. Thai
*Attorney, Agent, or Firm*—Wagner, Murabito & Hao

[57] ABSTRACT

A method and apparatus for optimizing sample fetching in a peripheral component interconnect (PCI) environment. In one embodiment the present invention generates a sample page base address corresponding to a first part of a first address received from a digital signal processor (DSP). The generated sample page base address is then stored in a sample page base address cache which can be accessed by the DSP without accessing a PCI bus. The first part of the first address is compared to a first part of a second address. Provided that the first part of the first address and the first part of the second address are the same, the present invention combines a second portion of the second address sent from the DSP with the generated sample page base address stored in the sample page base address cache. In so doing, the present invention generates a complete address of a sample to be fetched without accessing the PCI bus.

10 Claims, 6 Drawing Sheets

5,987,584

WAVETABLE ADDRESS CACHE TO REDUCE ACCESSES OVER A PCI BUS

TECHNICAL FIELD

The present claimed invention relates to the field of sample fetching. More specifically, the present claimed invention relates to fetching wavetable samples in a peripheral component interconnect (PCI) environment.

BACKGROUND OF THE INVENTION

Wavetable audio is a widely used and well known technique in the audio processing art for generating or recreating audio sounds. In the past, an audio processing component such as, for example, an audio card would have dedicated read only memory (ROM) associated therewith. Audio samples referred to as "wavetable samples" would be stored in the dedicated ROM. In order to recreate a particular sound (typically referred to as a "voice"), the audio card fetched the desired wavetable samples from the dedicated ROM, processed the sample, and created the desired voice. Commonly, numerous samples have to be fetched and processed in order to create a desired voice. Although dedicated ROM facilitates the rapid acquisition of numerous wavetable samples, permanently dedicating a specific portion of memory to a particular application is not always a cost effective or desired implementation.

Some prior art approaches to wavetable audio now store the avetable samples in system memory, for example, dynamic random access memory (DRAM). By storing the wavetable samples in system DRAM, the need to have a permanently dedicated memory space allocated for audio processing purposes is eliminated. That is, a particular memory space can be allocated storing wavetable samples at one time, and can then be used for another purpose at a different time. Also, by storing the wavetable samples in system memory, more space is available to store the samples. The use of system memory for storing wavetable samples is not without complications, however. In order to access wavetable samples stored in system memory, the digital signal processor of the audio card must access a PCI bus.

As shown in Prior Art FIG. 1A, when dedicated ROM is used to store the wavetable samples, the DSP 10 directly accesses the dedicated ROM 12. On the other hand, as shown in Prior Art FIG. 1B, DSP 10 must first access a PCI bus 14 before accessing wavetable samples stored in system memory 16. Thus, in such an instance, the DSP must request access to the PCI bus, receive a grant to the PCI bus, and traverse the PCI bus in order to fetch a wavetable sample from system memory. Such required actions prolong the sample fetching time, thus increasing audio processing latency. As a result, the quality of generated audio voices can suffer.

Additionally, wavetable samples stored in system memory are typically stored in a discontiguous manner. That is, in dedicated ROM applications, for example, an entire megabyte of wavetable samples is stored in a single contiguous block of memory space. In system memory applications, however, wavetable samples are typically stored in numerous discontiguous blocks of memory space. The numerous discontiguous blocks of memory space are referred to as "sample pages". With reference now to Prior Art FIG. 1C, a schematic diagram showing numerous wavetable sample pages, typically shown as 18, is given. By storing the numerous wavetable sample pages in separate discontiguous blocks of memory space, the sample pages can be stored in various locations within the system memory. In so doing, the need to allocate or reserve a single large contiguous block of system memory solely for wavetable samples is eliminated. Hence, effective use of the system memory is achieved.

Although, storing wavetable samples in various discontiguous locations permits effective use of system memory, such an approach necessitates an intricate addressing scheme. Referring now to Prior Art FIG. 2, a schematic diagram of a conventional architecture employed to fetch wavetable samples from system memory is shown. In the prior art architecture of Prior Art FIG. 2, a DSP 10, of Prior Art FIGS. 1A–1C, generates an address 200 corresponding to a respective wavetable sample. A sample page address table (SPAT) base address register 202 is disposed to receive part of address 200. An adder 204 then combines a SPAT base address with the received part of address 200. The combined address points to a particular location in a SPAT 206 residing in system memory. SPAT 206, in turn provides a sample page base address. The sample page base address points to the base of a particular wavetable sample page, typically shown as 208, residing in system memory. Thus, DSP 10 must access a PCI bus 14, of Prior Art FIGS. 1B and 1C, in order to fetch the base address of a given sample page. Hence, prior art schemes require "one trip" across PCI bus 14 simply to fetch the base address of a sample page.

Referring still to Prior Art FIG. 2, after the sample page base address has been fetched, another adder 210 combines the sample page base address with a sample page offset address. The sample page offset address comprises another portion of address 200 generated by DSP 10 of Prior Art FIGS. 1A–1C. The combined sample page base address and sample page offset address point to a particular entry in one of the wavetable sample pages, typically shown as 208. Thus, DSP 10 is then able to fetch a particular entry from the collection of wavetable sample pages 208. As mentioned above, wavetable sample pages 208 reside in system memory. Thus, after generating the complete wavetable sample page entry address, DSP 10 must make yet another trip across PCI bus 14 of Prior Art FIGS. 1B and 1C in order to fetch a respective wavetable sample page entry. Therefore, prior art sample fetching schemes require a first trip across a PCI bus to fetch a sample page base address, and then a second trip across the PCI bus to fetch a desired wavetable sample page entry. Hence, prior art sample fetching methods require at least two trips across a PCI bus. As mentioned above, each of the trips across the PCI bus requires the DSP to request access to the PCI bus, receive a grant to the PCI bus, and then traverse the PCI bus. Furthermore, if the grant to the PCI bus is lost, interrupted, or otherwise deasserted before the DSP has successfully fetched either the sample page base address or the wavetable sample page entry, the DSP must again regain access to the PCI bus. As a result, it is possible in prior art sample fetching schemes, that more than two trips across the PCI bus will be required to fetch a single wavetable sample page entry.

Additionally, it will be understood by those of ordinary skill in the art that a DSP will typically desire to consecutively fetch several wavetable sample page entries. As a result, the sample fetching latency incurred by repeatedly accessing the PCI bus can become a performance limiting factor.

Thus, a need exists for an apparatus and method which expedites sample fetching from system memory. A further need exists for an apparatus and method which decreases the need to access a PCI bus when fetching samples from system memory.

SUMMARY OF THE INVENTION

The present invention provides a method and apparatus which expedites sample fetching from system memory, and which decreases the need to access a PCI bus when fetching samples from system memory. The present invention accomplishes the above achievements with a method and apparatus which utilizes a localized cache memory to store the most-recently used sample page table address.

Specifically, in one embodiment, the present invention generates a sample page base address corresponding to a first part of a first address received from a digital signal processor (DSP). The generated sample page base address is then stored in a sample page base address cache which can be accessed by the DSP without accessing a PCI bus. The first part of the first address is compared to a first part of a second address. Provided that the first part of the first address and the first part of the second address are the same, the present invention combines a second portion of the second address sent from the DSP with the generated sample page base address stored in the sample page base address cache. In so doing, the present invention generates a complete address of a sample to be fetched without accessing the PCI bus.

The present invention also describes in detail the apparatus for performing the steps of the above described method.

These and other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a art of this specification, illustrate embodiments of the invention and, together with the description, serve to explain the principles of the invention.

Prior Art

Prior Art

Prior Art

Prior Art

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1A:
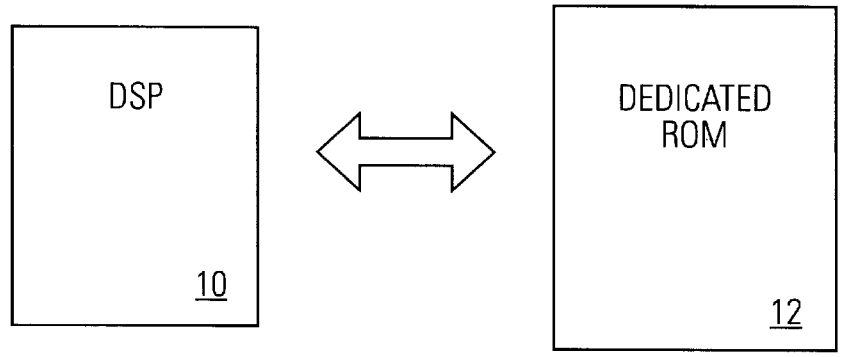
FIG. 1A is a schematic diagram of a conventional wavetable sample storing configuration in which a DSP has dedicated memory allotted thereto.
Figure 1B:
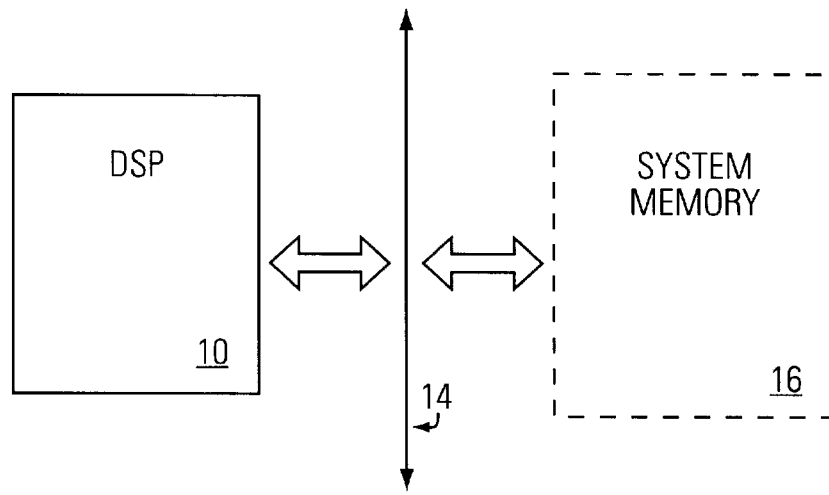
FIG. 1B is a schematic diagram of a conventional wavetable sample storing configuration in which a DSP must access a PCI bus before accessing wavetable samples stored in system memory.
Figure 1C:
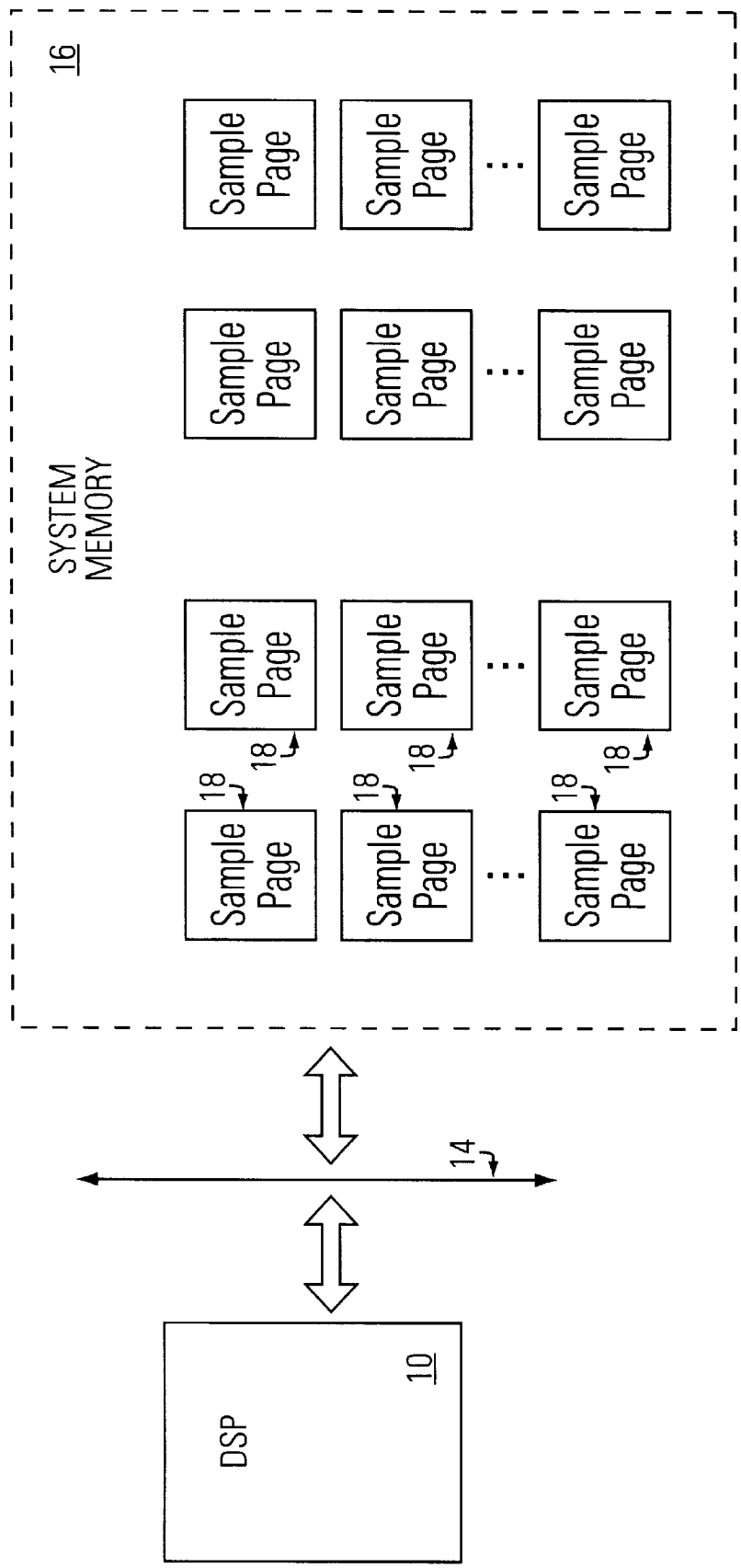
FIG. 1C is a schematic diagram of the conventional wavetable sample storing configuration of Prior Art FIG. 1B in which numerous discontiguous wavetable sample pages are stored in system memory.
Figure 2:
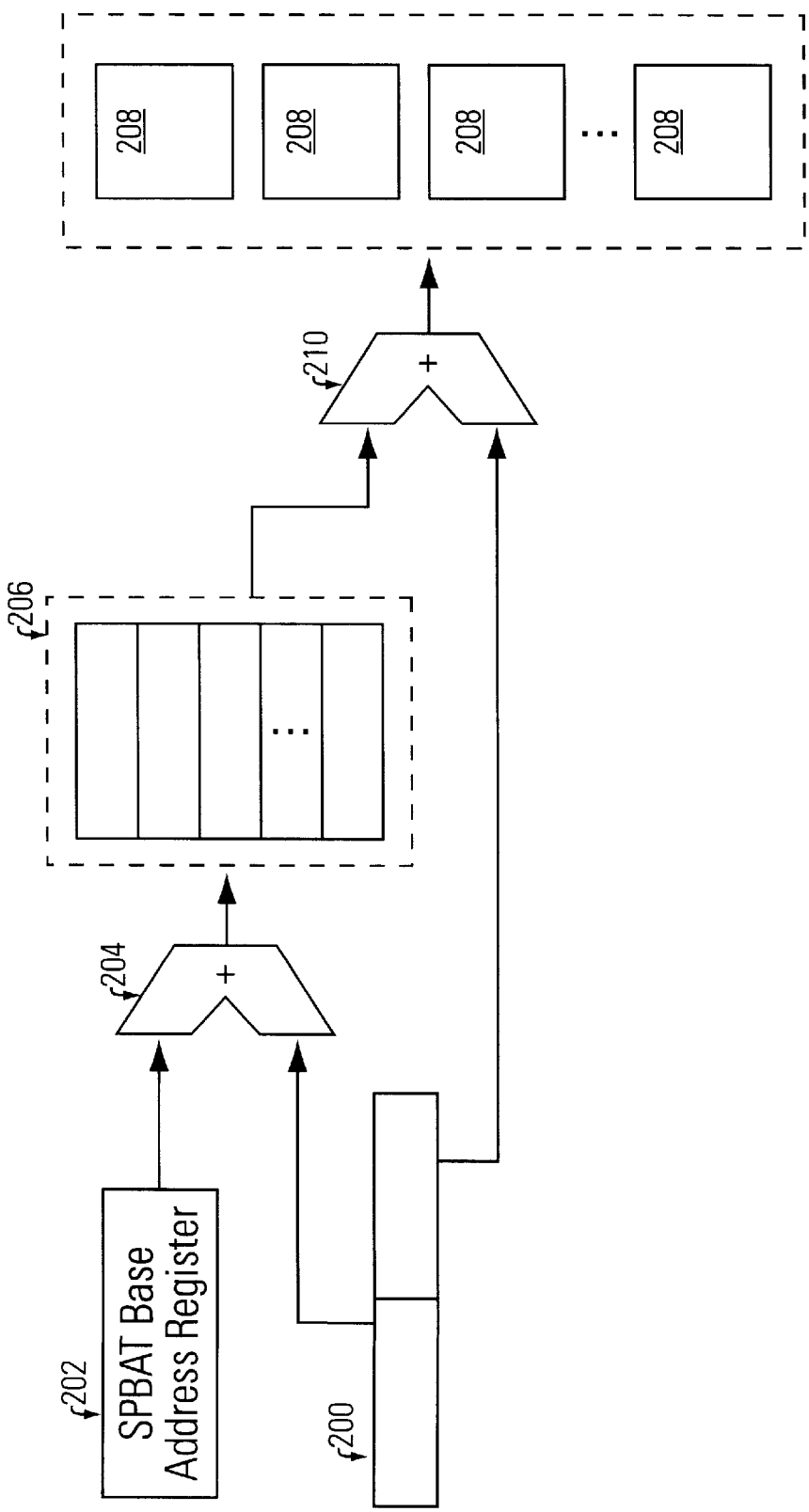
FIG. 2 is a schematic diagram of a conventional architecture employed to fetch wavetable samples from system memory.
Figure 3:
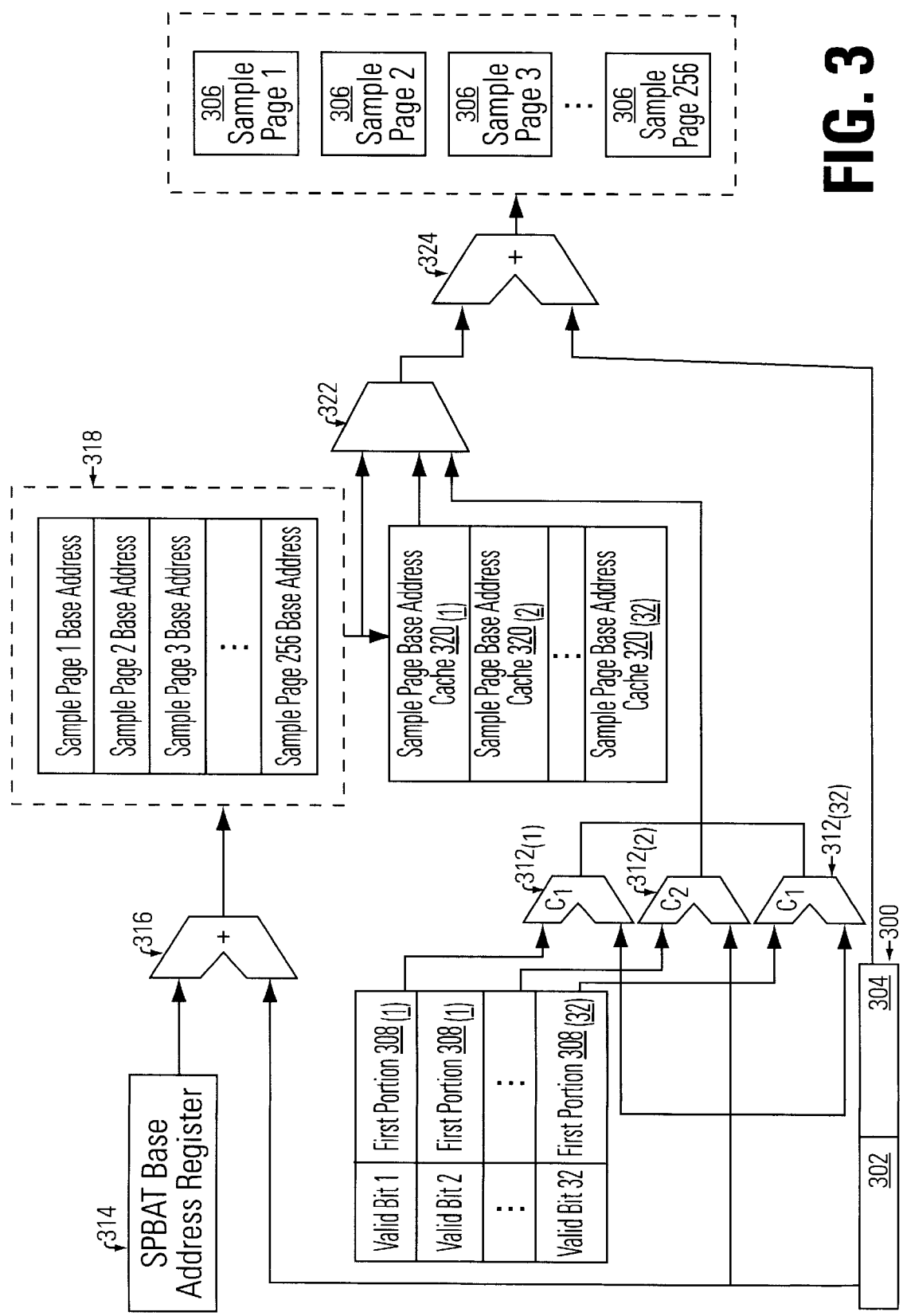
FIG. 3 is a schematic diagram of an architecture employed to expedite the fetching of wavetable samples from system memory in accordance with one embodiment of the present claimed invention.

With reference now to FIG. 3, a schematic diagram of an architecture employed to expedite the fetching of wavetable samples from system memory in accordance with one embodiment of the present claimed invention is shown. The following description of the present invention will begin with a detailed description of the physical structure and architecture of the present invention. This description will then be followed by a detailed description setting forth the operation of the present invention. Regarding the structure and architecture of the present invention, a DSP, not shown, generates an address 300 corresponding to a particular wavetable sample page entry which the DSP desires to fetch. Address 300 of the present embodiment is a 20 bit address having an eight bit first portion 302, and a twelve bit second portion 304. Eight bit first portion 302 corresponds to a specific one of 256 wavetable sample pages, typically shown as 306. Twelve bit second portion 304 corresponds to a specific entry in a particular wavetable sample page. Each of the 256 wavetable sample pages 306 of the present embodiment is comprised of 4 K bytes. Therefore, a 20 bit address 300 is used in the present embodiment to access the 1 megabyte of system memory occupied by the 256 wavetable sample pages. The present invention is also well suited to accommodating a larger or smaller address when a respectively larger or smaller amount of system memory space is occupied by the wavetable sample pages.

Referring still to FIG. 3, the present embodiment includes an address tag register 308 which is adapted to store a first portion of an address such as, for example, first portion 302 of address 300 therein. Hence, in the present embodiment, address tag register is an eight bit register for accommodating the eight bits of first portion 302 of address 300. The present invention is, however, well suited to having a larger or smaller address tag register when the first portion of the address generated by the DSP is accordingly larger or smaller than eight bits. The present embodiment also includes a valid bit register 310 and a comparator 312 which is coupled to the output of address tag register 308.

With reference still to FIG. 3, the present invention also includes a sample page address table (SPAT) base address register 314 coupled to an adder 316 which, in turn, is coupled to a SPAT 318. SPAT 318 contains 256 pointers to respective base addresses of particular wavetable sample pages 306. SPAT 318 resides in system memory. The present invention further includes a sample page base address cache 320 coupled to SPAT 318. In the present embodiment, sample page base address cache 320 is a 20 bit register adapted to store the 20 most significant bits of a 32 bit sample page address passed to sample page base address cache 320 from SPAT 318. Again, the present invention is also well suited to varying the size of sample page base address cache 320 when a larger or smaller amount of system memory space is occupied by the wavetable sample pages. The present embodiment also includes a multiplexor 322 adapted to receive inputs from comparator 312 and either SPAT 318 or sample page base address cache 320. The embodiment of FIG. 3 also includes an adder 324 coupled to the output of multiplexor 322 and adapted to receive as an input the second portion 304 of address 300.

Referring yet again to FIG. 3, in the present embodiment, only SPAT 318 and wavetable sample pages 306 reside in system memory. That is, all other components reside locally with respect to the DSP. For example, in one embodiment, all of the components except SPAT 318 and wavetable sample pages 306 reside on the same audio card as the DSP. In another embodiment, all components except SPAT 318 and wavetable sample pages 306 reside on the same audio chip as the DSP. Hence, in the present invention, all of the components except SPAT 318 and wavetable sample pages 306 can be accessed by the DSP without accessing a PCI bus. Additionally, although a DSP is said to fetch the wavetable sample page address and the particular wavetable sample page entry, it will be understood that in some applications, the DSP merely generates a 20 bit address such as address 300. In such applications, a state machine or other device performs the steps required to fetch the particular wavetable sample page entry, and then returns the fetched entry to the DSP. In such applications, the state machine or other fetching device is still delayed by PCI accessing requirements. Furthermore, although such a specific architecture is shown in the embodiment of FIG. 3, the present invention is also well suited to using various alternatives, modifications, and equivalents, which are included within the spirit and scope of the present claimed invention.

IN OPERATION

Figure 4A:
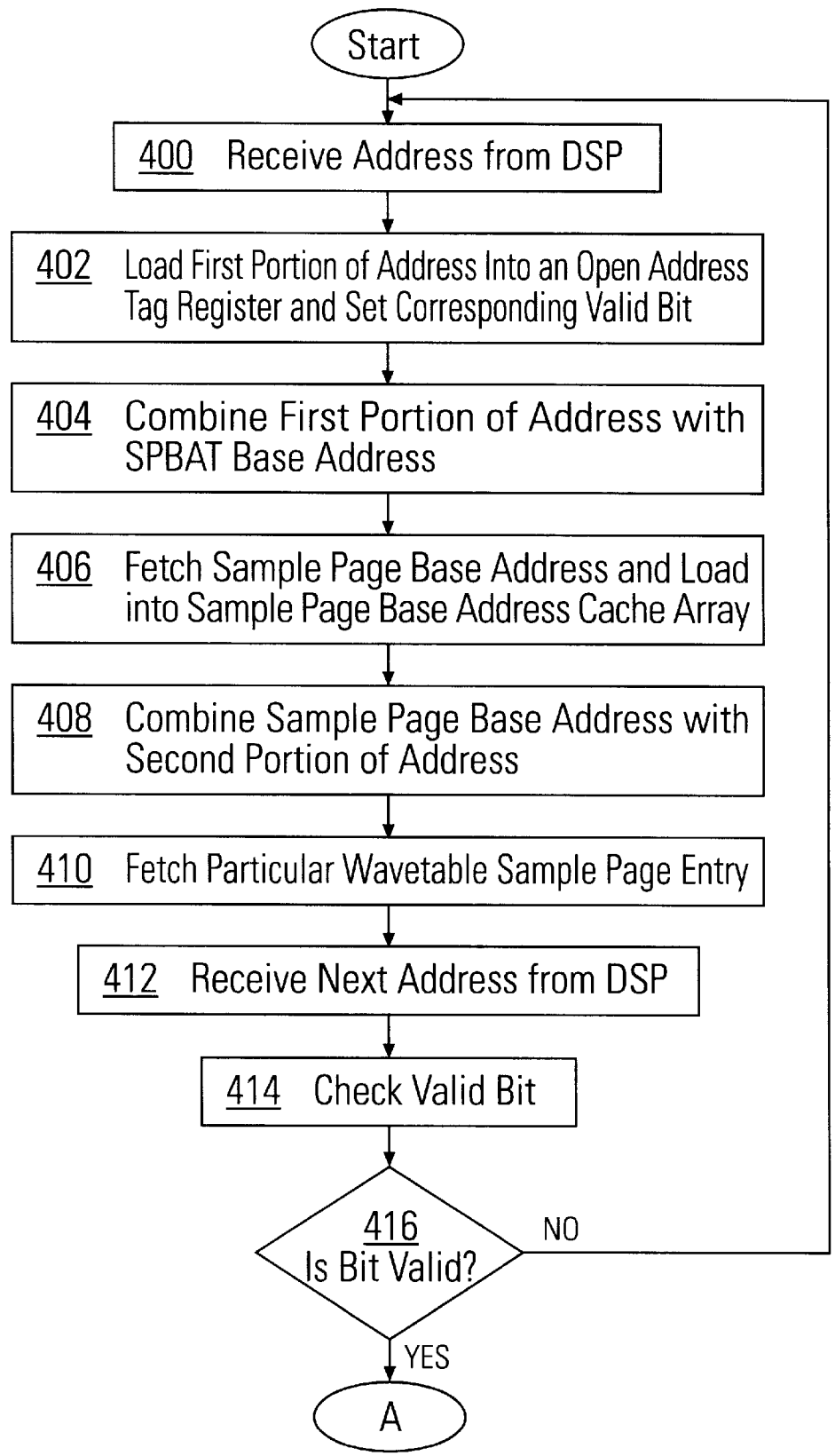
FIGS. 4A and 4B comprise a flow chart of steps performed in accordance with the present claimed invention.
Figure 4B:
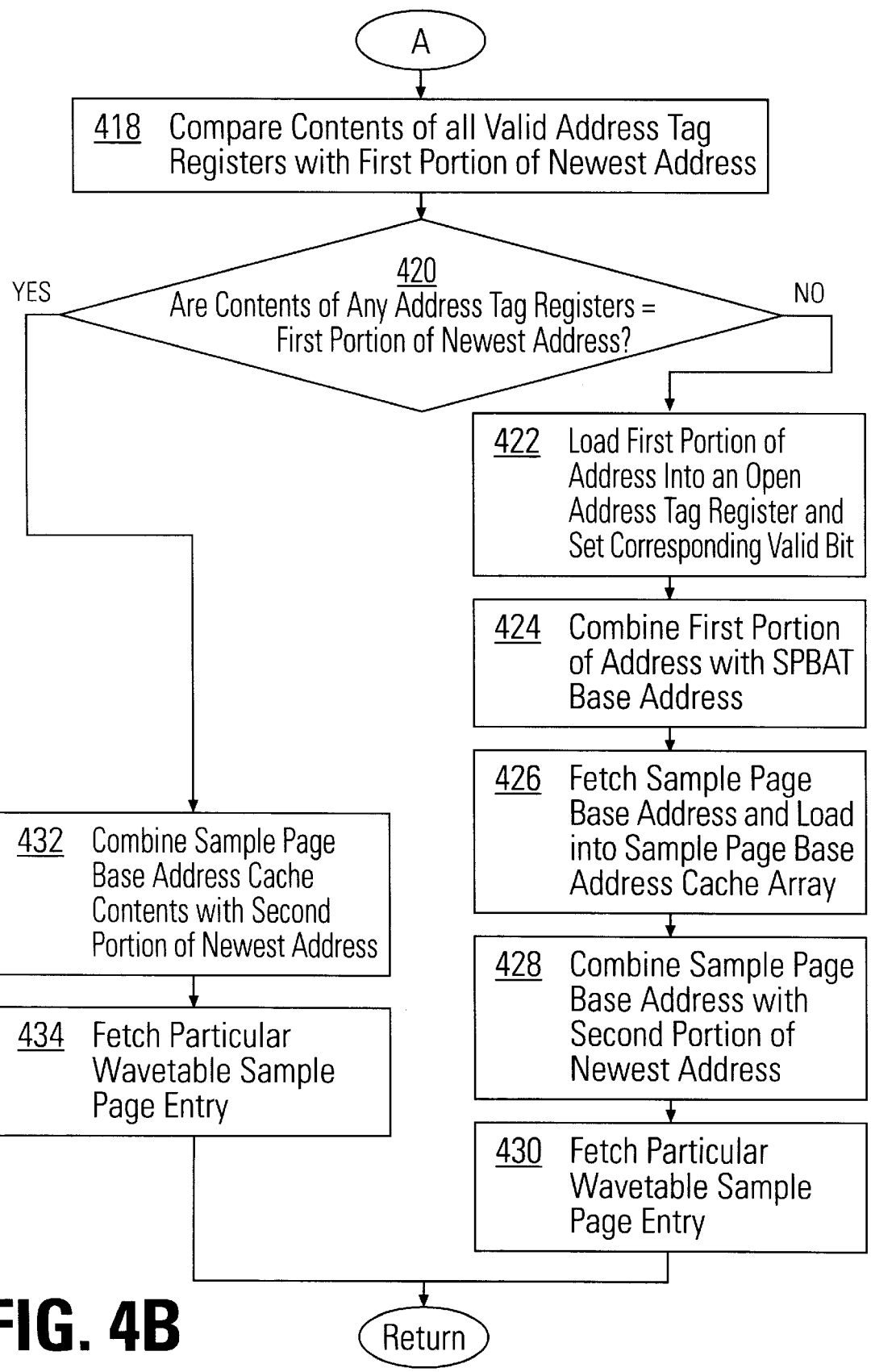

The following is a detailed description of the operation of the present invention. With reference now to FIGS. 4A and 4B, a flow chart of steps performed in accordance with the present claimed invention is shown. The steps of FIGS. 4A and 4B will be described in conjunction with the embodiment of FIG. 3. As shown in step 400, upon initial operation of the present invention, an address 300 is generated by a DSP, not shown. The first eight bit portion 302 of address 300 is loaded into eight bit address tag register 308. Additionally, in step 402 the contents of valid bit register 310 are set to indicate that the contents of address tag register 308 are valid.

In step 404, adder 316 combines first portion 302 of address 300 with a 32 bit address generated by SPAT base address register 314. The combined address points to a specific location within SPAT 318 which resides in system memory. As mentioned above, SPAT 318 contains pointers to respective base addresses of particular wavetable sample pages 306.

At step 406, the present invention fetches a desired wavetable sample page base address and loads the wavetable sample page base address into sample page base address cache 320. More specifically, the particular wavetable sample page base address corresponding to the combined first portion 302 of address 300 and the 32 bit address generated by SPAT base address register 314 is loaded into sample page base address cache 320. In the present embodiment, only the 20 most significant bits of the wavetable sample page base address are loaded into sample page base address cache 320. The present invention is also well suited to using a 21 bit sample page base address cache or a 22 bit sample page base address cache for 2 Mb and 4 Mb applications, respectively.

In step 408, the present invention combines the wavetable sample page base address with second portion 304 of address 300. That is, multiplexor 322 outputs the 20 bit sample page base address to adder 324. 12 bit second portion 304 of address 300 is also input to adder 324. Adder 324 combines the sample page base address with 12 bit second portion 304 to form a complete 32 bit wavetable sample page entry address.

As shown in step 410, the complete 32 bit address allows the DSP to fetch the desired wavetable sample page entry from system memory. Again, although a DSP is said to fetch the wavetable sample page address and the particular wavetable sample page entry, it will be understood that in some applications, the DSP merely generates a 20 bit address such as address 300. In such applications, a state machine or other device performs the steps required to fetch the particular wavetable sample page entry, and then returns the fetched entry to the DSP.

At step 412, the DSP generates another 20 bit address, hereinafter referred to as the newest address. In the present embodiment, the newest address, like previously received address 300 is comprised of an eight first portion, and 12 bit second portion.

Next, at step 414, the present invention checks the status of the contents of valid bit register 310.

As shown in step 416, if the contents of valid bit register 310 indicate that the contents of address tag register 308 are not valid, then the present invention returns to step 402 and performs steps 402 through 410 in order to fetch the wavetable sample entry corresponding to the newest received address. If the contents of valid bit register 310 indicate that the contents of address tag register 308 are valid, then the present invention proceeds to step 418.

Referring now to step 418, comparator 312 of the present invention compares the contents of address tag register 308 with the first portion of the newest address. If the contents of address tag register 308 are not the same as the first portion of the newest address, the present invention proceeds to step 422.

At step 422, the present invention load the first portion of the newest address into address tag register 308. Additionally, in step 422 the contents of valid bit register 310 are set to indicate that the contents of address tag register 308 are valid.

In step 424, adder 316 combines first portion of the newest address with a 32 bit address generated by SPAT base address register 314.

At step 426, the present invention fetches a desired wavetable sample page base address and loads the wavetable sample page base address into sample page base address cache 320.

In step 428, the present invention combines the wavetable sample page base address with second portion 304 of the newest address. That is, multiplexor 322 outputs the 20 bit sample page base address to adder 324. The 12 bit second portion of the newest address is also input to adder 324. Adder 324 combines the sample page base address with the 12 bit second portion of the newest to form a complete 32 bit wavetable sample page entry address.

As shown in step 430, the complete 32 bit address allows the DSP to fetch the desired wavetable sample page entry from system memory.

If, in step 420, the contents of address tag register 308 and the first portion of the newest address are the same, the present invention proceeds to step 432.

In step 432, the present invention combines the wavetable sample page base address stored in sample page base address cache 320 with the second portion of the newest address. That is, multiplexor 322 outputs the 20 bit sample page base address stored in sample page base address cache 320 to adder 324. The 12 bit second portion of the newest address is also input to adder 324. Adder 324 combines the previously stored sample page base address with the 12 bit second portion of the newest address to form a complete 32 bit wavetable sample page entry address. Thus, the present invention is able to generate a complete 32 bit wavetable sample page entry address without accessing system memory. Instead of accessing a SPAT residing in system memory, the present invention uses the previously stored sample page base address stored in a cache which resides locally with respect to the DSP.

In audio processing, numerous proximately stored wavetable samples are often fetched successively. Hence, numerous entries stored on the same wavetable sample page may be fetched successively. Therefore, the first portion of successive addresses sent from the DSP will often be identical. By storing the sample page base address in a locally disposed sample page base address cache, the present invention eliminates the need for the DSP to access the PCI bus to reach a SPAT in system memory. Instead, the present invention compares the first portion of a newest received address with the first portion of the most-recently used address. If the two address portions are the same, the present invention retrieves the sample page base address from a sample page base address cache instead of from system memory. Thus, the present invention reduces latency and improves bandwidth. In fact, by eliminating one of the two PCI bus trips typically required to fetch a single wavetable sample entry, the present invention can reduce fetching latency by almost as much as 50 percent over prior art systems.

As shown in step 434, the complete 32 bit address allows the DSP to fetch the desired wavetable sample page entry from system memory.

By reducing the required number of times the DSP needs to access the PCI bus, the present invention increases the number of voices which the DSP can fetch and process in a given time period. As a result, the present invention dramatically increases DSP sound performance.

Thus, the present invention provides a method and apparatus which expedites sample fetching from system memory, and which decreases the need to access a PCI bus when fetching samples from system memory.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A method for optimizing sample fetching in a peripheral component interconnect (PCI) environment, said method comprising the steps of:

a) generating a sample page base address corresponding to a first part of a first address received from a digital signal processor (DSP);

b) storing said generated sample page base address in a sample page base address cache which can be accessed by said DSP without accessing a PCI bus;

b1) storing said generated sample page base address in a 20 bit sample page base address cache which can be accessed by said DSP without acessing a PCT bus;

c) comparing said first part of said first address to a first part of a second address;

c1) receiving at a comparator said first portion of said first address, said first portion of said first address sent to said comparator from an address tag register; wherein said address tag register is an eight bit register;

c2) receiving said first portion of said second address sent from said DSP at said comparator; and c3) using said comparator to compare said first portion of said second address to said first portion of said first address, said comparator disposed so as to receive said first portion of said first address from said address tag register and said first portion of said second address from said DSP without accessing said PCT bus; and d) combining a second portion of said second address from said DSP with said generated sample page base address stored in said sample page base address cache provided said first part of said first address and said first part of said second address are the same such that a complete address of a sample to be fetched is generated without accessing said PCI bus.

2. The method for optimizing sample fetching in a PCI environment as recited in claim 1 wherein step a) further comprises the step of:

combining said first part of said first address with a sample page address table base address.

3. The method for optimizing sample fetching in a PCI environment as recited in claim 1 wherein step c) further comprises the step of:

checking a valid bit register to determine whether said address tag register contains valid information.

4. The method for optimizing sample fetching in a PCI environment as recited in claim 1 wherein step d) further comprises the step of:

combining a sample page offset address from said DSP with said generated sample page base address stored in said sample page base address cache provided said first part of said first address and said first part of said second address are the same such that a complete address of said sample to be fetched is generated without accessing said PCI bus.

5. The method for optimizing sample fetching in a PCI environment as recited in claim 1 wherein step d) further comprises the steps of:

receiving at an adder said generated sample page base address stored in said sample page base address cache;

receiving at said adder said second portion of said second address sent from said DSP; and using said adder to combine said generated sample page base address with said second portion of said second address provided said first portion of said first address and said first portion of said second address are the same such that said complete address of said sample to be fetched is generated without accessing said PCI bus.

6. A wavetable address cache apparatus for reducing latency and optimizing bus bandwidth when fetching wavetable samples in a peripheral component interconnect (PCI) environment, said apparatus comprising:

a sample page base address table adapted to receive a first portion of a first address sent from a digital signal processor (DSP), said sample page base address table adapted to generate a first sample page base address corresponding to said first portion of said first address sent from said DSP;

a sample page base address cache coupled to said sample page base address table, said sample page base address cache adapted to store said sample page base address corresponding to said first portion of said first address, said sample page base address cache disposed so as to be accessible by said DSP without accessing a PCI bus;

an address tag register adapted to receive and store said first portion of said first address sent from said DSP, said address tag register disposed so as to receive said first portion of said first address from said DSP without accessing said PCI bus;

a valid bit coupled to said address tag register for indicating whether said address tag register contains valid information;

a comparator coupled to said address tag register, said comparator adapted to receive a first portion of a second address sent from said DSP and compare said first portion of said second address to said first portion of said first address received from said address tag register, said comparator disposed so as to receive said first portion of said first address from said address tag register and said first portion of said second address from said DSP without accessing said PCI bus; and an adder coupled to said comparator, said sample page base address table, and said sample page base address cache, said adder adapted to receive a second portion of said second address from said DSP, said adder further adapted to combine said second portion of said second address with said first sample page base address stored in said sample page base address cache provided said first portion of said first address and said first portion of said second address are the same, said adder further adapted to combine said second portion of said second address with a second sample page base address generated by said sample page base address table wherein said second sample page base address corresponds to said first portion of said second address sent from said DSP provided said first portion of said first address and said first portion of said second address are not the same;

wherein said sample page base address cache is a twenty (20) bit address each, and said address tag register is an eight (8) bit register.

7. The wavetable address cache apparatus of claim 6 further comprising:

a sample page address table base address register coupled to said sample page base address table, said sample page address table base address register adapted to receive said first portion of said first address from said DSP and point said first portion of said first address to an appropriate location within said sample page address table.

8. The wavetable address cache apparatus of claim 6 wherein said first portion of said first address corresponds to a respective wavetable sample page.

9. The wavetable address cache apparatus of claim 6 wherein said second portion of said second address corresponds to an entry in a respective wavetable sample page.

10. A method for efficiently fetching samples in a peripheral component interconnect (PCI) environment, said method comprising the steps of:

a) generating a sample page base address corresponding to a first part of a first address received from a digital signal processor (DSP);

b) storing said generated sample page base address in a 20 bit sample page base address cache which can be accessed by said DSP without accessing a PCI bus;

c) receiving at a comparator said first portion of said first address, said first portion of said first address sent to said comparator from an eight bit address tag register;

d) checking a valid bit register to determine whether said address tag register contains valid information;

e) receiving at said comparator a first portion of a second address sent from said DSP;

f) using said comparator to compare said first portion of said second address to said first portion of said first address, said comparator disposed so as to receive said first portion of said first address from said address tag register and said first portion of said second address from said DSP without accessing said PCI bus;

g) receiving at an adder said generated sample page base address stored in said sample page base address cache;

h) receiving at said adder a sample page offset address sent from said DSP; and i) using said adder to combine said generated sample page base address with said sample page offset address provided said first portion of said first address and said first portion of said second address are the same such that a complete address of a sample to be fetched is generated without accessing said PCI bus.

* * * * *